United States Patent Office 3,649,548
Patented Mar. 14, 1972

3,649,548
NON-HAZARDOUS KETONE PEROXIDE
POLYMERIZATION INITIATORS
Chester M. McCloskey, Altadena, and Donald E. Rees and George Hoff, Glendora, Calif., assignors to The Norac Company, Inc., Azusa, Calif.
No Drawing. Continuation-in-part of application Ser. No. 638,643, May 15, 1967. This application Aug. 17, 1970, Ser. No. 64,662
Int. Cl. C07c 73/00; C08f 1/60
U.S. Cl. 252—186    10 Claims

ABSTRACT OF THE DISCLOSURE

Nonhazardous ketone peroxide compositions are prepared by the addition of chlorooctanes, and ethers boiling from 170 to 195° C.

This invention relates to new nonhazardous polymerization initiator compositions. This application is a continuation in part of copending application Ser. No. 638,643 filed May 15, 1967, now Pat. No. 3,557,009.

It is an object of this invention to provide ketone peroxide compostions that are free from the explosive decomposition that ketone peroxides normally exhibit when heated to high temperatures.

It is another object of this invention to provide ketone peroxide compositions that have good storage stability, and are efficient initiators for the polymerization of ethylenically unsaturated compounds.

Ketone peroxides are used extensively for the initiation of polymerization of ethylenically unsaturated compounds and their use is well known in the art. While thermal initiation is often employed they have found their most extensive use in the so-called room temperature polymerizations employing a soluble sicative metal salt such as cobalt octoate, with the "unsaturated polyester resins." These resins are composed of an unsaturated alkyl resin dissolved in a monomer such as styrene or methyl methacrylate.

A wide range of ketone peroxides have been employed but the most common ones have been prepared from methyl ethyl ketone, cyclohexanone and methyl amyl ketone. The hazardous nature of organic peroxides in general and ketone peroxides in particular is well known in the art. The ketone peroxides prepared from the higher molecular weight ketones such as methyl amyl ketone, in which the active oxygen content is lower, do not require diluents in order to be handled with reasonable safety. The peroxides prepared from the lower molecular weight ketones in which the active oxygen content is higher require diluents for safe handling. The most commonly employed diluents are dimethyl phthalate and dibutyl phthalate. The active oxygen concentration is usually adjusted to around 11%. While these diluents provide reasonable safety for ordinary handling, even ketone peroxides diluted to 11% active oxygen concentration may decompose explosively when held at high temperatures for a prolonged period of time.

The ketone peroxide in widest general use at the present time is methyl ethyl ketone peroxide. The commercial material is commonly marketed as a 60% solution in dimethyl phthalate with an active oxygen concentration of 11%. Cyclohexanone peroxide is marketed as an 85% paste or moist solid with dibutyl phthalate as the diluent and an active oxygen concentration of 11%. Cyclohexanone peroxide is also marketed as a solution in combination with methyl ethyl ketone peroxide employing dimethylphthalate as the diluent at an active oxygen concentration of 11%.

A composition can be obtained by sufficient dilution of the ketone peroxide with dimethyl phthalate that does not exhibit explosive decomposition even when boiled to dryness. With simple compositions this occurs in the range of 40–48% methyl ethyl ketone peroxide depending on the concentration of free oxygen peroxide. The dilute solutions, however, have not found general acceptance because of the added expense of the diluent, the resulting higher freight and container cost and the desire to minimize the amount of inactive diluent in many formulations.

The term "nonhazardous" as used herein encompasses primarily suppression of the rapid decomposition exhibited by ketone peroxides when heated to high temperatures which results in explosions or detonations even when unconfined. It is understood that some of the compositions that are "nonhazardous" by this definition may burn readily or even accelerate during a burning as do most organic peroxides.

The term "phlegmatizer" is used in explosive technology to describe materials or compounds that desensitize or stabilize. While the diluents commonly employed with ketone peroxides can properly be classed as phlegmatizers for simplification, the term is reserved herein to refer exclusively to the suppression of the explosive decomposition of these materials.

The term "ketone peroxide" as used herein is used in the common sense and refers to the monomers or open chain polymers of the hydroxy-hydroperoxides or dihydroxy peroxides which are formed from ketones (4–7 carbons) and hydrogen peroxide and which are in general commercial use. It is not intended to include the cyclic-polymeric ketone peroxides which do not readily undergo redox decomposition with soluble salts of sicative metals, which do not have general application as polymerization initiators and which in many cases are highly explosive in nature. In addition to the ketone peroxide and diluent, small amounts of water and hydrogen peroxide are often present.

It has been discovered in accordance with the present invention that chlorooctanes and dialkyl, aralkyl alkyl and aryl alkyl ethers boiling in the range of 170 to 195° C. are effective phlegmatizers or desensitizers for ketone peroxides and suppress the rapid accelerating decomposition that results in explosions when these peroxides were heated to high temperature. The effectiveness of these compounds is directly related to the boiling point. Thus ethers and halogenated alkanes boiling outside of this range require either very high concentrations of phlegmatizer in order to suppress the explosive decomposition or are ineffective. At an active oxygen concentration of 11% approximately 10% of the phlegmatizing diluent is required for effective stabilization to explosive decomposition. At an active oxygen concentration of 10.6%, 5% of the phlegmatizing diluent gives variable results although of a much lower hazard than the control. By increasing the diluent to 30%, an active oxygen concentration of 11½% is stable. Decreasing the active oxygen concentration below the 11% decreases the amount of phlegmatizing diluent required until in the vicinity of an active oxygen concentration of 9.2%, only 5% is required.

While the phlegmatizing diluent can be employed as the entire diluent, in the methyl ethyl ketone peroxide compositions it is much more common for the diluent to be added in an effective concentration either after preparation or prior to the preparation of the ketone peroxide along with a processing diluent such as dimethyl phthalate or dibutyl phthalate. Other diluents often incorporated in ketone peroxide compositions are 2-ethyl-1-hexanol, ethyl acetate, diallyl phthalate, dibutyl phthalate, butyl Cellosolve, propylene glycol and 2-ethylhexyl acetate. It is necessary, however, that the phlegmatizing diluent be compatible with other diluents employed. If the latter diluents boil below 140° C. then the concentration of the phlegmatizing diluent compared to the ketone peroxide should be approximately equivalent to the amount that would be required if employed alone. In addition to the above diluents small concentrations of water and hydrogen peroxide are often present in ketone peroxide compositions. The ethers will tolerate somewhat more water and hydrogen peroxide than will the chlorooctanes. The ethers and chlorooctanes have a high compatibility with monomers and resins, are low in viscosity and are especially useful with "polyester resins," particularly in spray applications.

Useful phlegmatizing ethers are o, n, p-tolyl-, methyl and ethyl ethers; benzyl-, methyl and ethyl ethers, cyclohexyl butyl ether, diisopentyl, n-propyl heptyl and di-2-methylbutyl ethers. The term alkyl encompasses both alkyl and cycloalkyl as employed herein. The dialkyl ethers appear to be slightly more efficient phlegmatizers than the aryl alkyl ethers and the chlorooctanes. The effective boiling point range of these compounds is greatly reduced in comparison with the esters and alcohols, nevertheless within their effective range they are efficient phlegmatizers. The examples illustrate principally the minimum concentration of phlegmatizing diluent required. Thus at higher concentrations a low hazard composition would be obtained and the concentration would be limited only by the desired dilution of the ketone peroxide. At high concentration some phlegmatization outside the 170–195° C. boiling point range is observed. Within this range, compounds boiling between 170–185° C. are most effective with the exception of the dialkyl ethers with about 170–180° C. being optimum except for the latter.

The ethers and chlorooctanes can be combined with other phlegmatizing diluents such as alcohols or esters where compatibility permits to otbain the desired physical properties as well as a nonhazardous composition.

The concentration of hydrogen peroxide that can be employed depends on the compatibility with the ketone peroxide and phlegmatizing diluent and on the concentration of the latter. When hydrogen peroxide is present in appreciable quantities, a higher concentration of phlegmatizer must be employed than would otherwise be required. About 2% hydrogen peroxide is a practical working limit particularly with the chlorooctanes.

Other compatible organic peroxides may be present in addition to the ketone peroxides providing that they do not change the basic hazard characteristics of the compositions.

The storage stability of ketone peroxide compositions containing chlorooctanes or ethers varies depending on the particular diluent but is comparable to compositions in commercial use.

Ethers and chlorooctanes have a minor influence on the effectiveness of the compositions as polymerization initiators. Such variations that exist are primarily related to the structure of the diluent, particularly the presence of secondary or tertiary hydrogen or chlorine atoms that may participate in chain transfer or other free radical processes. These are variations that are well understood in the art and exist in current commercial formulations.

EXAMPLE 1

The typical "unsaturated polyester resin," or, polyester resin, as they are commonly called in the trade, used in the following examples was prepared as follows: 65 parts alkyd resin, acid No. 45–50 prepared from 1 mole maleic anhydride, 1 mole phthalic anhydride and 2.2 moles propylene glycol, plus 35 parts styrene, 0.13 part hydroquinone and 0.03 part of cobalt as cobalt octoate.

EXAMPLE 2

The TCT Test in the following examples refers to a test developed by Mr. Howard Greer of Bel Air, Tex. It consists essentially of placing 100 ml. of the composition to be tested in a steel can similar to those used for frozen juice, inserting a 250 watt immersion heater, and observing the results of heating to destruction. The sample may boil to dryness, catch fire, pop, or explode violently depending on the composition. The can may be left standing intact or in violent explosion, completely disintegrate. It has been found to be at least as reproducable as the PVT Test. Like the latter, it must be run under standardized conditions but is an effective procedure for determining the behavior of peroxide compositions under severe conditions.

EXAMPLE 3

Preparation of ketone peroxides.

Methyl ethyl ketone peroxide compositions were obtained by reacting 150 g. methyl ethyl ketone, 159 g. of 50% hydrogen peroxide and 115 g. of the phlegmatizer in the presence of 1.5 g. of sulfuric at 55° C. for one hour. The reaction product was dried over sodium sulfate, the unreacted methyl ethyl ketone removed by distillation. The desired concentration of methyl ethyl ketone peroxide composition was obtained by the addition of phlegmatizer.

EXAMPLE 4

The following diluents were tested for effectiveness in suppressing explosive decomposition of methyl ethyl ketone peroxide as follows: to 100 g. of a composition of methyl ethyl ketone peroxide and dimethyl phthalate with an active oxygen content of 11.6% was added 10 g. of additive to give a final active oxygen content of 10.55%. The additive thus constitutes about 21½% of the diluent present. The TCT Test is described in Example 2.

| Additive | Boiling point, ° C. | TCT test |
| --- | --- | --- |
| Halogenated compounds | | |
| Bromoethane | 40 | Explosion. |
| 1,1,1-trichloroethane | 72–8 | Do. |
| 1,1,2-trichloroethane | 114 | Do. |
| Bromoform | 150 | Do. |
| 1,2,3-trichloropropane | 156 | Do. |
| 3-chloromethylheptane | 171–3 | Variable. |
| 2-ethyl-1-chlorohexane | 174 | Do. |
| O-dichlorobenzene | 179–83 | Explosion. |
| Chlorinated biphenyl (21%) | 275–325 | Do. |
| Chlorinated biphenyl (32%) | 290–325 | Do. |
| Ethers | | |
| Dioxane | 101 | Explosion. |
| Dibutyl ether | 142 | Do. |
| Anisole | 154–5 | Do. |
| Phenetoleg | 172 | Mild explosion. |
| Diphenyl ether | 259 | Explosion. |

EXAMPLE 5

The following diluents were tested as described in Example 4.

| Phlegmatizing diluent | Percent concentration | Active oxygen, percent | Boiling point, °C. | TCT test |
|---|---|---|---|---|
| 1-chlorooctane | 9 | 10.6 | 182 | Fire. |
| Do | 9 | 11 | 182 | Do. |
| Do | 5 | 10.6 | 182 | Moderate. |
| Do | ¹9 | 10.6 | 182 | Fire. |
| Do | 1 | 9.2 | 182 | Fire or very mild. |
| Do | 2 | 9.2 | 182 | Do. |
| 2-ethylhexyl chloride | ²30 | 11.8 | 174 | Fire. |
| Dipentyl ether | 9 | 10.6 | 190 | Do. |
| Do | 5 | 9.2 | 190 | Fire or mild. |
| Do | ¹9 | 10.6 | 190 | Fire. |
| Do | ³11 | 10.6 | 190 | Do. |
| 2-Ethylhexyl chloride | 4.5 } | 10.6 { | 174 | } Fire or moderate. |
| 2-Ethylhexyl acetate | 4.5 } | | 198 | |
| Dipentyl ether | 2 } | 10.6 { | 190 | } Moderate. |
| 2-ethylhexyl acetate | 2 } | | 198 | |
| 2-ethylhexyl chloride | 4.5 } | 10.6 { | 174 | } Fire or mild. |
| Dipentyl ether | 4.5 } | | 190 | |
| 2-ethylhexyl chloride | 9.6 } | 11 | | Explosion. |
| Hydrogen peroxide (50%) | 4.00 } | | | |
| 2-ethylhexyl chloride | 12.5 } | 10.4 | | Mild. |
| Hydrogen peroxide (50%) | 2.0 } | | | |
| Dimethyl phthalate | 52.5 } | 9.4 | | Explosion. |
| Hydrogen peroxide (50%) | 4.1 } | | | |
| Dimethyl phthalate | 55.4 | 8.2 | 282 | Fire. |
| Do | 50 | 9.2 | 282 | Moderate. |
| Do | 42 | 10.6 | 282 | Explosion. |
| o-Methylanisole | 10 | 9.2 | | Fire. |
| p-Methylanisole | 10 | 9.2 | | Fire-moderate. |
| Benzyl methyl ether | 10 | 9.2 | | Mild. |
| Do | 5 | 9.2 | | Moderate. |
| 1-chlorooctane ³ | 10 | 9.2 | | Mild. |
| o-Methylanisole ³ | 10 | 9.2 | | Do. |
| 2-ethylhexyl chloride ⁴ | 10 | 9.2 | | Mild-moderate. |
| Butyl benzyl phthalate ³ | | 9.2 | | Severe explosion. |
| Dipropyleneglycol dibenzoate ⁴ | | 9.2 | | Do. |

¹ Methyl ethyl ketone peroxide 42.5%, cyclohexanone peroxide 16.5%.
² Phlegmatizing diluent added at time of preparation of ketone peroxide.
³ Butyl benzyl phthalate replacing dimethyl phthalate as primary diluent.
⁴ Dipropyleneglycol dibenzoate replacing dimethyl phthalate as primary diluent.

We claim:

1. A nonhazardous ketone peroxide composition consisting essentially of a ketone peroxide selected from the group consisting of methyl ethyl ketone peroxide and cyclohexanone peroxide, the ketone peroxide concentration being from about 8.2 to 11.5% active oxygen; from about 5 to 60% of a phlegmatizing compound selected from the group consisting of chlorooctanes, aryl alkyl, aralkyl alkyl, and dialkyl ethers, boiling from about 170 to 195° C.; 0 to 2% of hydrogen peroxide; 0 to 55% of a compatible diluent; in which the total active oxygen concentration does not exceed 11.5% and the minimum concentration of phlegmatizing compound increases with increasing active oxygen concentration.

2. The composition of claim 1 in which the phlegmatizing compound is a chlorooctane.

3. The composition of claim 2 in which the phlegmatizing compound is selected from the group consisting of 1-chlorooctane and 2-ethylhexyl chloride.

4. The composition of claim 2 in which the phlegmatizing compound is 2-ethylhexyl chloride.

5. The composition of claim 1 in which the phlegmatizing compound is selected from the group consisting of aryl alkyl ethers and dialkyl ethers boiling from about 170 to 195° C.

6. The composition of claim 5 in which the phlegmatizing compound is selected from the group consisting of o-methylanisol, phenyl ethyl ether and dipentyl ether.

7. The composition of claim 6 in which the phlegmatizing compound is dipentyl ether.

8. The composition of claim 1 wherein the boiling point of the phlegmatizing compound is from about 170 to 180° C.

9. The composition of claim 1 in which the compatible diluent is predominantly a phthalate ester.

10. The composition of claim 9 in which the compatible diluent is predominantly dimethyl phthalate.

References Cited

UNITED STATES PATENTS

| | | | |
|---|---|---|---|
| 2,176,407 | 10/1939 | Milas | 260—610 R |
| 3,324,040 | 6/1967 | Spoor | 252—186 |
| 3,330,871 | 7/1967 | Magali et al. | 260—610 R |
| 3,428,689 | 2/1969 | Manly | 260—610 A |
| 3,462,370 | 8/1969 | Winter et al. | 252—186 |
| 3,507,800 | 4/1970 | Laveskis | 252—186 |
| 3,538,011 | 11/1970 | van der Klaguw | 252—186 |

LEON D. ROSDOL, Primary Examiner

I. GLUCK, Assistant Examiner

U.S. Cl. X.R.

252—99; 260—502 R, 610 R, 610 A